INVENTOR.
DANIEL J. SIKORRA
BY Roger W. Jensen
ATTORNEY

INVENTOR.
DANIEL J. SIKORRA
BY Roger W. Jensen
ATTORNEY 3,239,768

DEMODULATOR HAVING ITS TWO CHANNELS ALTERNATELY RENDERED INACTIVE TO AN INPUT SIGNAL

Daniel J. Sikorra, Champlin, Minn., assignor to Honeywell Inc., a corporation of Delaware Filed Apr. 22, 1963, Ser. No. 274,758
11 Claims. (Cl. 329—50)

This invention pertains in general to demodulators and more particularly to a demodulator wherein the reference transformer which is used to supply a reference signal may also be used on other similar demodulators without inducing interactions in the output signals obtained between demodulators.

In the various embodiments of this invention a signal converting device which operates on a principle similar to that of a differential amplifier is used. In other words, the signal converting device will provide a given output signal when an input of a given polarity is applied to a first input and will give the same output signal when a signal of the opposite polarity but equal amplitude is provided at a second input. An input signal to be demodulated is applied through isolating resistors to the two inputs of the signal converting device and the inputs are alternately shunted to ground or otherwise connected so that the first half cycle of the input signal is applied to the first input of the signal converting device while the second half cycle is applied to the second input of the signal converting device. In this manner direct voltage signals are obtained at the output which vary in magnitude and polarity depending upon the input amplitude and phase of the alternating signal which is to be demodulated.

Thus the invention resides in the use of a signal converting device such as a differential amplifier which has its inputs alternately rendered inactive or unreceptive to an input signal which is applied to the two inputs of the signal converting device.

It is an object of this invention to provide a demodulating device which will be more adaptable to microminiaturization techniques through minimizing the number of transformers and/or windings.

A further object of this invention is to provide a new and novel method of demodulating an alternating signal.

Further objects and advantages of this invention will be apparent from a reading of the specification in conjunction with the claims and drawing in which:

Figure 1:
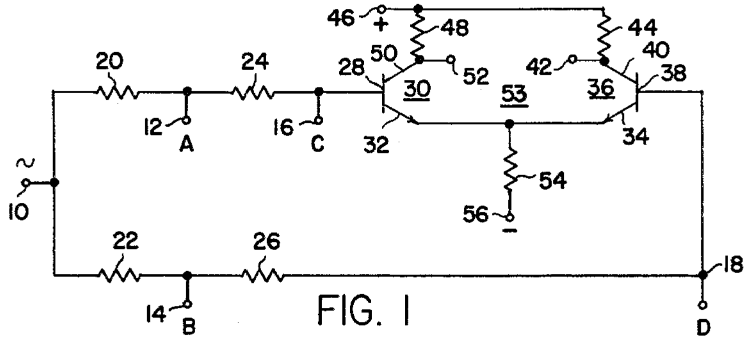
FIGURE 1 is a schematic diagram of a portion of the basic circuit.

In FIGURE 1, terminal 10 is an input terminal for applying input signals thereto. Terminals 12, 14, 16, and 18 are additionally labeled as terminals A, B, C, and D respectively. These terminals are used to attach other circuits to the basic circuit shown in FIGURE 1. A resisor 20 which may be termed in some instances an isolating resistor or calibration resistor is connected between input terminal 10 and terminal 12. A second isolating or calibration resistor 22 is connected between input 10 and terminal 14. A resistor 24, which may also be termed in some instances an isolating or calibration resistor, is connected between terminal 12 and terminal 16. A fourth resistor 26, which may in some instances be called an isolating or calibration resistor, is connected between terminal 14 and terminal 18. Terminal 16 is also connected to a base 28 of a voltage control means, amplifying means, valve means or NPN transistor means 30. An emitter 32 of transistor 30 is connected to an emitter 34 of a voltage control means, valve means, amplifying means or NPN transistor means 36, having a base 38 and a collector 40. Base 38 is connected to terminal 18. Collector 40 is connected to an output terminal 42 and to one end of a resistor 44 which has its other end connected to a power terminal 46 which in this embodiment is positive. Another resistor 48 is connected between power terminal 46 and a collector 50 of transistor 30. Collector 50 is further connected to an output terminal 52. The transistors 30 and 36 along with their associated circuitry constitute a signal converting means or differential amplifier means 53. A resistor 54 is connected between emitter 32 of transistor 30 and a negative power terminal 56.

Figure 2:
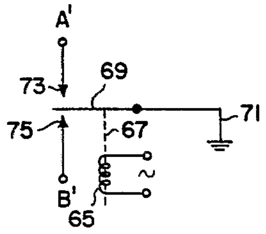
FIGURE 2 is a mechanical chopper used in conjunction with FIGURE 1 to provide a shunting or chopping function.

FIGURE 2 is a representation of an electro-mechanical chopper having a coil 65 attached by mechanical means shown as dashed line 67 to a vibrating contact 69. Vibrating contact 69 is attached to ground or reference potential 71. Stationary contacts 73 and 75 are connected to terminals A′ and B′ respectively. The vibrating contact 69 which is permanently attached to ground 71 alternately makes electrical connections to contacts 73 and 75 in accordance with an alternating signal supplied to coil 65.

Figure 3:
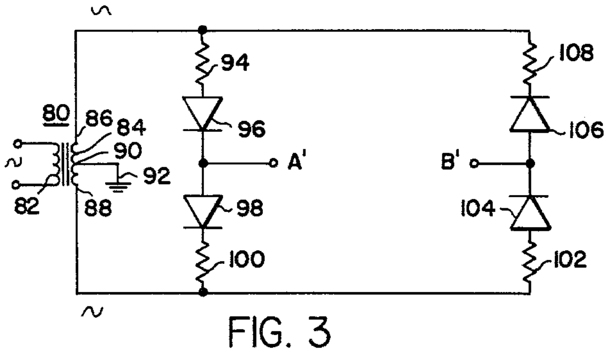
FIGURE 3 shows one embodiment of a completely electronic chopper which may be used in conjunction with FIGURE 1.

In FIGURE 3 a transformer generally designated 80 has a primary winding 82 and a secondary winding 84. Secondary winding 84 has end leads 86 and 88 with an intermediate tap 90 connected to ground 92. A resistor 94 is connected between lead 86 and one end of a diode 96. This end of the diode is referred to as the anode. The other or cathode end of diode 96 is connected to a junction point or output terminal A′. A′ is also connected to one end or the anode end of a diode 98. The other or cathode end of diode 98 is connected to a resistor 100 which has its other end connected to lead 88. A resistor 102 is connected between lead 88 and one end or the anode end of a diode 104. A terminal B′ is connected to the cathode end of diode 104 and to the anode end of a diode 106. A resistor 108 is connected between the cathode end of diode 106 and lead 86 of transformer 80. In summary diodes 96 and 98, which may be termed diode switching means or chopping means, are connected in series to allow easy current flow from lead 86 of transformer 80 to lead 88. Diodes 104 and 106, which also may be called switching or chopping means, are connected in the opposite direction and in series to allow current flow in the easy direction from lead 88 to lead 86 of transformer 80.

Figure 4:
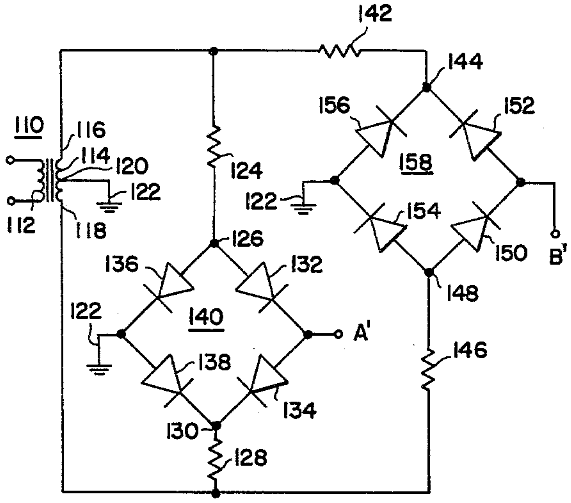
FIGURE 4 illustrates a second embodiment of an electronic chopper which may be used in conjunction with FIGURE 1 wherein diodes are used in a bridge network arrangement.

FIGURE 4 illustrates a somewhat more complex diode switching embodiment of a chopper than is illustrated in FIGURE 3. A transformer 110 has a primary winding 112 and a secondary winding 114. Secondary winding 114 has end leads 116 and 118 and an intermediate tap 120 which is connected to ground or reference potential 122. A resistor 124 is connected between lead 116 and a junction point 126. A resistor 128 is connected between lead 118 and a junction point 130. Diodes 132 and 134 are connected in series between junction point 126 and junction point 130. A junction intermediate the two diodes 132 and 134 is labeled A′. Two more diodes 136 and 138 are also connected in series between junction points 126 and 130 with a junction between the two diodes connected to ground 122. The four diodes constitute a bridge circuit generally designated 140 and are connected in a direction to allow easy current flow from junction point 126 to junction point 130. A resistor 142 is connected between lead 116 of transformer 110 and a junction point 144. Another resistor 146 is connected between lead 118 of transformer 110 and a junction point 148. Two diodes 150 and 152 are connected in series between junction points 148 and 144 to allow a direction of easy current flow from junction point 148 toward junction point 144. A terminal B′ is inserted at a junction between the two diodes 150 and 152. Two more diodes 154 and 156 are connected in parallel with diodes 150 and 152 between junction points 148 and 144 to allow a direction of easy current flow in the same direction. A junction appearing between diodes 154 and 156 is connected to ground 122. The last four mentioned diodes constitute a bridge 158. In summary, the bridge circuits of FIGURE 4 are somewhat similar to FIGURE 3 in that the diode bridge which has an output of terminal A′ has a direction of easy current flow in one direction with respect to the reference transformer secondary whereas the other diode bridge having an output terminal B′ has an easy direction of current flow opposite the first bridge.

Figure 5:
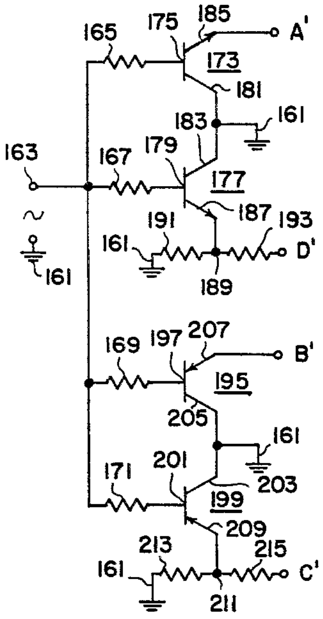
FIGURE 5 illustrates a transistor chopper which may be used in conjunction with FIGURE 1.

In FIGURE 5 an input signal is applied between a reference potential or ground 161 and an input terminal 163. Four resistors 165, 167, 169 and 171 each have one end connected to input terminal 163. A valve means, voltage control means, amplifying means or NPN transistor means 173 has a base 175 connected to the other end of resistor 165. A valve means, voltage control means, amplifying means or NPN transistor 177 has a base 179 connected to the other end of transistor 167. A collector 181 of transistor 173 and a collector 183 of transistor 177 are connected together and to ground 161. An emitter 185 of transistor 173 is connected to an output terminal A′. An emitter 187 of transistor 177 is connected to a junction point 189. A resistor 191 is connected between junction point 189 and ground 161. A resistor 193 is connected between junction point 189 and an output terminal D′. A valve means, voltage control means, amplifying means, or PNP transistor means 195 has a base 197 connected to the other end of resistor 169. A valve means, voltage control means, ampliyfying means or PNP transistor means 199 has a base 201 connected to the other end of resistor 171. A collector 203 of transistor 199 is connected to a collector 205 of transistor 195 and also to ground 161. An emitter 207 of transistor 195 is connected to output terminal B′. An emitter 209 of transistor 199 is connected to a junction point 211. A resistor 213 is connected between ground 161 and junction point 211. A resistor 215 is connected between junction point 211 and an output terminal C′.

Figure 6:
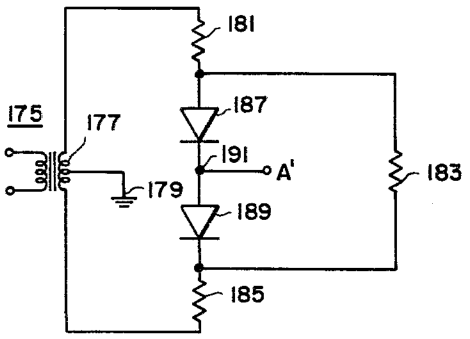
FIGURE 6 is a half wave embodiment of a diode chopper wherein limiting action is obtained.

In FIGURE 6 a transformer generally designated as 175 has a secondary winding 177. An intermediate tap of the secondary winding 177 is connected to ground 179. Three resistors 181, 183 and 185, which may be termed voltage dividing means, are connected in series between the ends of secondary windnig 177. Two diodes 187 and 189, which may be termed diode switching means, chopping means, or gating means are connected in series and in parallel with the center resistor 183. A junction point 191 between the diodes 187 and 189 is connected to an output terminal A′. The diodes 187 and 189 are connected so that the direction of easy current flow through the diodes is the same for both of these diodes.

Figures 7, 9:
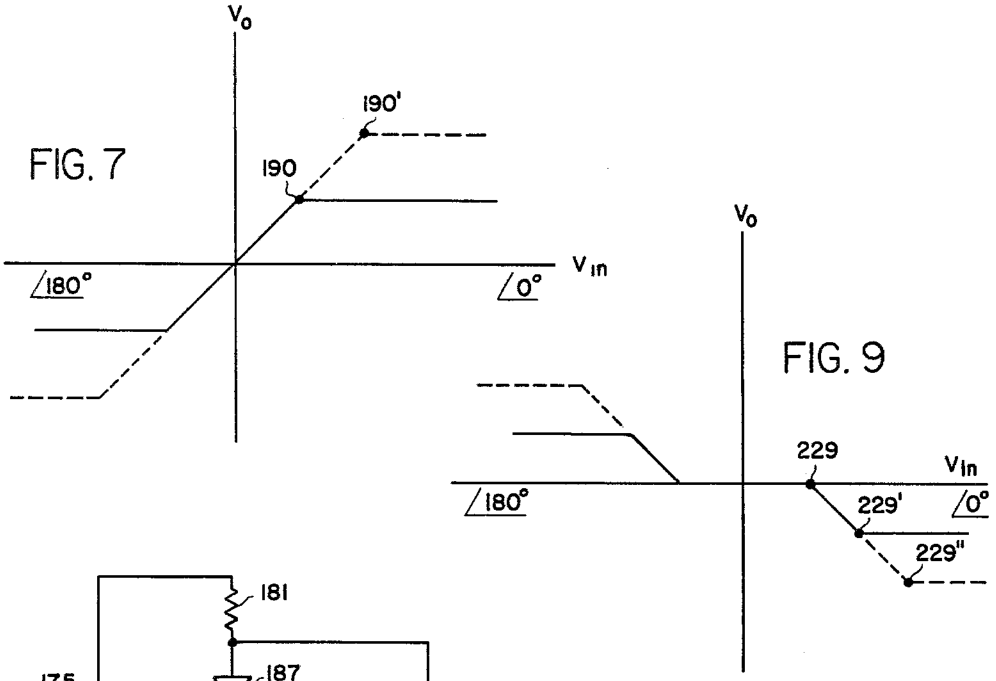
FIGURE 7 is a curve representative of the output obtained when utilizing the chopper of FIGURE 6 in conjunction with FIGURE 1.
FIGURE 9 is a curve representative of the output obtained when the chopper of FIGURE 8 is utilized in conjunction with FIGURE 1.

In FIGURE 7 the horizontal axis is representative of the input signal and is labeled $V_{in}$ with the right hand side of the graph being the inphase or zero phase input signal and the left hand side being the out-of-phase or 180° input signal. The vertical axis is representative of $V_o$ or the output signal with the upper portion being a positive output signal and the lower portion being a negative output signal. A curve representing the output voltage has a break or step at a point 190. The voltage point 190 is proportional to the voltage across resistor 183 during the half period of nonconduction of diodes 187 and 189. An extended dashed line curve is shown with a break at 190′ which represents the voltage appearing across the end leads of secondary winding 177.

Figure 8:
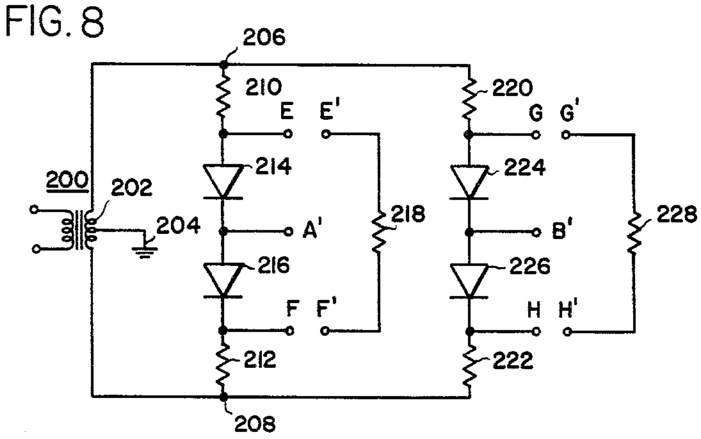
FIGURE 8 illustrates another embodiment of a chopper wherein limiting action is obtained.

In FIGURE 8 a transformer 200 has a secondary winding 202 with an intermediate tap connected to ground 204. The ends of secondary winding 202 are connected to junction points 206 and 208 respectively. A resistor 210 is connected between junction point 206 and a junction point or terminal E. A resistor 212 is connected between junction point 208 and a junction point or terminal F. Two diodes 214 and 216 are connected between junction points E and F and have a junction point or output terminal A′ situated therebetween. The direction of easy current flow through these diodes is from junction point 206 toward junction 208. A resistor 218 is connected between junction points E′ and F′ and is adapted to be connected to the junction points E and F. A resistor 220 is connected between junction point 206 and a junction point G. A resistor 222 is connected between junction point 208 and a junction point H. A diode 224 is connected in series with a diode 226 between junction points G and H and are situated such that the direction of easy current flow is from G to H. An output terminal B′ is connected to a junction point between the two diodes 224 and 226. A resistor 228 is connected between terminals G′ and H′ which are adapted to be connected to the previously mentioned terminals G and H.

FIGURE 9 has the same horizontal and vertical axes as described in conjunction with FIGURE 7. Further a point 229 on a curve in FIGURE 9 is representative of the voltage at which the input signal amplitude substantially equals one half the voltage across resistor 218. A second point 229′ is representative of the blocking voltage at which the input siganl amplitude substantially equals one-half the blocking voltage across resistor 228. A third point 229″ on a dashed extension of the main curve is representative of the voltage at which the input signal amplitude substantially equals half the blocking voltage obtained from secondary winding 202 when resistor 228 is removed from the circuit.

Figure 10:
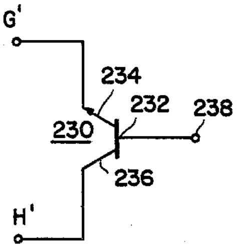
FIGURE 10 is a circuit diagram of a transistor which may be used with FIGURE 8 and FIGURE 1 to obtain limiting action in accordance with an input signal applied to this transistor.

In FIGURE 10 a transistor or amplifier means 230 has a base 232, an emitter 234 and a collector 236. An input terminal 238 is connected to base 232 while an output terminal G′ is connected to emitter 234 and an output terminal H′ is connected to collector 236.

OPERATION

Although it is not shown it must be realized before commencing a discussion of the operation of this circuit that the transistors 30 and 36 are biased to an ON condition by some means. This bias may be obtained in some embodiments by a voltage divided network connected between positive power terminal 46 and negative power terminal 56. However, the embodiment shown utilizes current which will flow from ground, through the input signal means, input 10, the isolating resistors, the bases 28 and 38, the emitters 32 and 34 to negative power terminal 56 to keep transistors 30 and 36 in an ON condition.

The first embodiment is a very simple one using the electromechanical chopper of FIGURE 2 wherein A′ and B′ are connected to the points A and B of FIGURE 1. If an alternating signal such as is shown near terminal 10 is applied to this input terminal in synchronization and in phase with the signal applied to coil 65 of the chopper, a succession of complete half wave pulses will appear at the output terminals 42 and 52. It may be assumed that on the positive half cycle of the input signal the vibrating contact 69 is electrically connected to contact 75. This places junction 14 at ground potential and eliminates any signal flow between input 10 and base 38 of transistor 36. In effect the chopper is shunting the input signal to ground. However, the input signal is also being applied through resistors 20 and 24 to the base 28 of transistor 30. This signal is not interrupted since the contact 69 at this period of time is only electrically connected to contact 75. This positive going pulse for the first half cycle produces a negative going pulse at output terminal 52 with respect to output terminal 42. In the next half cycle the input signal is negative and this same frequency signal repositions vibrating contact 69 to electrically connect to contact 73. This places junction point 12 at ground potential and eliminates current flow to transistor 30. In this position however the input signal is applied to base 38 of transistor 36. This negative going signal makes the output terminal 42 go in a positive direction with respect to output terminal 52. However, the effect of terminal 42 going positive with respect to terminal 52 is the same as the terminal 52 going negative with respect to terminal 42. For this reason the output signal is another negative going pulse as considered previously when a positive signal was applied to the base 28 of transistor 30. This is the standard method of operation as will be realized by those skilled in the art. If the phase of the input signal is to be reversed or if the signal applied to coil 65 is 180° out of phase with that shown, the positive signal will be applied to transistor 36 while the negative half cycle will be applied to transistor 30. This will produce positive half cycle pulses at the output terminal 52 with respect to output terminal 42. It can thus be seen that a very simple method of obtaining a demodulation is shown. The presently described combination is of course not readily adaptable for microminiaturization since an electromechanical chopper would be larger than all the rest of the circuit combined.

A circuit which is more adaptable to microminiaturization may be obtained by removing the circuit of FIGURE 2 from FIGURE 1 and attaching FIGURE 3 to the junction points A and B of FIGURE 1 from the appropriate junction points A′ and B′ of FIGURE 3. It may be assumed that the signals at leads 86 and 88 have the characteristics as shown with respect to ground 92, that is that terminal or lead 86 is going negative with respect to ground at the same time that lead 88 is going positive with respect to ground and at the same time that the input signal applied to terminal 10 is going positive with respect to ground. Under these conditions current will not flow through diodes 96 and 98 but will flow through diodes 104 and 106. Since current is not flowing through diodes 96 and 98 there is no effect on the junction point A′. If it be assumed that resistors 102 and 108 have the same resistance value and if the tap 90 is a center tap, then the terminal B′ will be at a central voltage between the leads 86 and 88 or in other words will be at ground potential. If B′ and thus terminal 14 is at ground potential any input signal is effectively prevented from being applied to base 38 of transistor 36. However, as mentioned previously, the terminal A is not grounded and therefore the input signal is applied to the base 28 of transistor 30 to obtain a negative half cycle. Upon the next half cycle of the reference and input signals, the diodes 96 and 98 are rendered conductive while diodes 104 and 106 are rendered nonconductive. This places junction point A′ and therefore junction point 12 at ground potential while leaving B′ and therefore junction point 14 unaffected. This presents the signal from being applied to transistor 30 but allows the input signal to be applied to transistor 36. As previously explained, this signal again allows another negative going pulse at output terminal 52 with respect to output terminal 42. It can thus be seen that FIGURE 3 will accomplish the same result as FIGURE 2. Many combinations or sets of four diodes such as shown in FIGURE 3 may be utilized to supply the chopping or shunting action to various demodulating circuits such as shown in FIGURE 1 and thus only one reference transformer such as transformer 80 is required for many demodulating circuits. As will be realized by those skilled in the art, one transformer will weigh as much as many demodulating circuits and therefore the elimination of even one transformer per demodulating circuit is a great weight saving. This embodiment while not eliminating transformers completely at least reduces the number of transformers to only one for all the demodulators which may be required.

The operation of the circuit shown in FIGURE 4 is very similar to the operation of the circuit shown in FIGURE 3. The terminals A′ and B′ are connected to to appropriate points in FIGURE 1. When the reference signal is such that bridge 140 is conducting, junction point A will be grounded, thus preventing the input signal being applied at input 10 from affecting transistor 30. This same half cycle of the reference signal will back bias the bridge network 158 so that junction point B will be unaffected and the input signal will thus be allowed to vary the voltage at base 38 and therefore at collector 40 to produce an output signal. On the next half cycle the opposite conditions will prevail. As can be seen, FIGURE 4 is merely a different embodiment of producing the same result as is accomplished by FIGURE 3.

While it has been assumed in combining the other choppers with FIGURE 1 that the transistors 30 and 36 of the differential amplifier were biased at ground potential by resistors not shown or biased through the use of an alternating signal being applied to input 10 through a transformer secondary which has the other end connected to ground, it will be realized that these methods of biasing are not always available or there are some reasons for not biasing in this manner. Further it will be realized that if for one reason or another the bases 28 and 38 of transistors 30 and 36 are not biased exactly at ground potential, the choppers such as that shown in FIGURE 2 will produce an alternating output signal even with no input signal. This is true since if base 28 is not exactly at ground potential then it will be placed at ground potential or at least closer to ground potential when vibrating contact 69 is connected to contact 73 and a disturbance in the bias condition of transistor 30 occurs. It would thus appear that there is an input signal being applied due to an output signal appearing between terminals 52 and 42 even though such is not the case. This alternating output can be reduced by feedback techniques or using a filter in the output circuit. A transistorized version of a chopper in FIGURE 5 also reduces or minimizes any sources of error due to the fact that the bases 28 and 38 are biased exactly at ground potential. Another reason for using transistors is to reduce output direct voltage effects resulting from direct voltage effects within the gate itself and not from amplifier input bias level. This configuration further allows resistance values to be chosen such that terminals 42 and 52 will be at ground potential when no input signal is applied to input 10. If desired, terminals 42 and 52 can also be placed at ground potential through the use of another amplifier stage.

It may be assumed that terminals A′, B′, C′, and D′ are connected to the respective terminals A, B, C, and D of FIGURE 1. As mentioned in conjunction with the other circuits, the signal applied at terminal 10 may be applied through the secondary of a transformer which has its other lead connected to ground. Current flows from ground through the secondary winding and the resistors 20, 22, 24, 26 to the bases 28 and 32 to keep transistors 30 and 36 in an operating condition. If suddenly junction point A is placed at ground potential an output will be obtained at output terminal 52. If however the bases to both transistors 30 and 36 are disturbed in the same direction at the same time there will be no resulting output. This is the basis for using four transistors in FIGURE 5 rather than two. When a negative input signal occurs between input 161 and 163 the first half cycle will turn transistors 195 and 199 to an ON condition. Transistors 173 and 177 will not be affected since they are constructed to turn ON with the opposite polarity signal as compared with the two transistors 195 and 199. When transistor 195 turns to an ON condition point B is brought towards ground potential. The resistors 213 and 215 are of the same value as and the same resistance ratio as the resistors 20 and 24 respectively, and are connected to the base 28 of transistor 30. Thus with no input to terminal 10 there is the same effect in bringing both bases toward ground at the same time. Since opposite polarity signals applied to the two inputs of a differential amplifier produce the same output with respect to ground, it will be realized that two signals of the same polarity applied to the two inputs of a differential amplifier will produce the same polarity output signals with respect to ground. These output signals will be of equal magnitudes and of the same polarities and will therefore cancel out to produce no resulting output signal between terminals 42 and 52. Although there is a current flowing from ground through transistor 195, terminal 14, and resistor 26 to the base of transistor 36, it is balanced by the current flowing from ground through transistor 199, resistor 215, and then to the base of transistor 30. There is an unbalance current which is also flowing to transistor 30 from the source 10 in the form of a direct current. This unbalance current is counteracted by the direct current signal flowing through resistors 191 and 193 to the base 38 of transistor 36. It can thus be seen that the signals being applied to the differential amplifier are completely balanced. On the next half cycle the transistors 173 and 177 are turned to an ON condition while the transistors 195 and 199 are turned OFF. In this connection the input signal, if any, is shunted to ground instead of being applied to transistor 30 and the only input signal applied is applied to transistor 36. In this manner the transistor choppers shown in FIGURE 5 operate in a manner very similar to that described for the other embodiments. The main advantage for FIGURE 5 is the fact that if a transformer is used to supply the reference voltage it does not have to be center tapped and may be any device which can apply an alternating reference voltage superimposed upon a direct voltage potential which may be the same potential as the reference potential for the input signal applied at input terminal 10.

As will be realized by one skilled in the art, the transistors 177 and 199 and the associated circuitry may be deleted and approximately the same result will be obtained as if the circuitry of FIGURE 3 is used. In this situation feedback techniques may be used to substantially eliminate any alternating component on the out put signal obtained from the demodulators.

FIGURE 6 is similar to FIGURE 3 with the elimination of one of the diode switches and the addition of resistor 183. If the resistor 183 is eliminated in the circuit of FIGURE 6, the output signal obtained from FIGURE 1 when the two are connected will be a half wave signal which is a straight line function and follows the slope of the curve in FIGURE 7 as is shown from the zero voltage point in the figure to point 190′ on the dashed line. The output increases until it is equal to the input signal from input 10 and then changes slope as is shown by the dashed line in FIGURE 7. The main curve shown by the solid line is similar to the dashed curve except that the maximum output voltage obtainable is less due to the action of resistor 183 in the voltage divider network. The reason that the resistor 183 changes the slope is due to the fact that the voltage across the diodes 187 and 189 is reduced from that obtained from the secondary winding 177. As soon as the input voltage reaches a voltage substantially equivalent to the voltage at point 190, the input current will flow through the diode 189 to ground 179 in the event that the input signal is positive. Actually of course the input voltage must be slightly higher than the voltage across resistor 183 to overcome the forward breakdown voltage of diode 189. If the input signal is negative, it of course will flow through the diode 187 instead of 189. This action thus prevents any further current from the input source from being applied to transistor 30 of FIGURE 1. As previously mentioned, this same limiting action is obtained by the transformer itself when the input voltage is greater than the output voltage of the transformer which is used as a reference voltage for the switching diodes. However, as explained before, the same reference transformer would be used for many different demodulating circuits and it may be desirable to have different voltage limits for each demodulator.

If FIGURE 8 is compared with FIGURE 3 it will be noted that the major difference after disregarding the shunting resistors 218 and 228 is that the two sets of diodes are both connected in the same direction. This connection without the shunting diodes being attached will apply the same signal to the bases 28 and 38 of the transistors 30 and 36 so that there will be no resultant direct voltage output signal. This type of connection has no use by itself. However, it may be desirable where an output signal is needed only after the input signal reaches a predetermined value such as is shown at point 229 in FIGURE 9. This result may be obtained by connecting resistor 218 to its appropriate connection points E and F. If it is desired that the output remain constant after another level of input voltage such as 229′ is reached, the resistor 228 is connected to the terminal points G and H. Of course if resistor 228 were not used, the output would still be limited at point 229″ by the secondary output voltage of transformer 200. As thus described the resistor 228 has to be of a larger resistance value than the resistor 218. If resistor 218 is smaller it will place a lower voltage in the reverse direction across diodes 214 and 216 thereby allowing the input signal to be directed toward ground through one of these diodes before this same condition results through the junction point B′. Various numbers of diode switches or other type switches may be used with different limiting devices to create a variety of voltage functions. A zener diode could also be used to replace the shunting resistors such as 218.

It may be desirable to vary the step function or the point at which the step occurs in FIGURE 7 or FIGURE 9. This may be accomplished by using the transistor of FIGURE 10 across the switching diodes or as suggested across diodes 224 and 226 at points G and H. By changing an input signal applied to terminal 238, the voltage from emitter 234 to collector 236 can be varied to vary the point at which the input signal will be diverted from being applied to base 38 of transistor 36 and instead be connected to ground 204. This may be very desirable in test equipment or in any other devices or apparatus wherein it is desirable to control the maximum output voltage in accordance with a third signal.

Several embodiments have been shown to illustrate that the invention lies in the use of a signal converting device such as a differential amplifier wherein the same output signal will be obtained when input signals of the same amplitude but of opposite polarities are applied to one or the other of the input terminals. This device is utilized by dividing an input signal into two parts and applying them to the two input terminals of the signal converting device and then alternatively and successively shunting the inputs to ground or otherwise restricting the input signal from being applied to one or the other of the inputs of the signal converting device.

It is recognized that similar devices may be used as a series switch between the input 10 and the bases 28 and 38 of the transistors 30 and 36 of the differential amplifier but this is not a preferred embodiment and accordingly has not been shown. It is intended however that the terms switching means, gating means and chopping means be broad enough to include both series or shunt type switches. Further, although the term resistor has been used in the specification it is to be realized that other impedances such as capacitors may be used in substitution in some embodiments.

Other variations and modifications will occur to those skilled in the art and this invention is not to be limited to the embodiments shown which are merely preferred embodiments. While some of the terms in this specification have been amplified as to their meaning to obtain the broadest possible scope, it is not intended to thereby limit the meaning of other terms which have not been so amplified and accordingly I wish to be limited only by the scope of the appended claims.

What is claimed is:

1. In demodulating apparatus whereby only one reference transformer is required for a plurality of demodulation stages comprising, in combination:
reference potential means;
means for supplying an alternating input signal with respect to said reference potential means;
differential amplifier means including output means and first and second input means;
isolation resistance means connected between said input signal supplying means and said differential amplifier input means;
reference means for supplying opposite phase signals with respect to said reference potential means between first and second terminal means;
first and second diode means connected in series between said first and second terminal means for permitting current flow from said first terminal means to said second terminal means, a first junction being formed between said first and second diode means;
means connecting said first junction means to said first input means of said differential amplifier means, the passage of an input signal to said first input means of said differential amplifier being inhibited when said first terminal means is positive with respect to said second terminal means;
third and fourth diode means connected in series between said first and second terminal means for permitting current flow from said second terminal means to said first terminal means, a second junction being formed between said first and second diode means; and
means connecting said second junction means to said second input means of said differential amplifier means, the passage of an input signal to said second input means of said differential amplifier being inhibited when said second terminal means is positive with respect to said first terminal means.

2. In demodulating apparatus whereby only one refernce transformer is required for a plurality of demodulation stages comprising, in combination:
reference potential means;
means for supplying an input signal with respect to said reference potential means;
differential amplifier means including output means and first and second input means;
reference means for supplying opposite phase signals with respect to said reference potential means between first and second terminal means;
first and second diode means connected in series between said first and second terminal means, a first junction being formed between said first and second diode means;
means connecting said first junction means to said first input means of said differential amplifier means, the passage of an input signal to said first input means of said differential amplifier being inhibited when the reference signal causes current flow through said first and second diode means;
third and fourth diode means connected in series between said first and second terminal means, a second junction being formed between said first and second diode means; and
means connecting said second junction means to said second input means of said differential amplifier means, the passage of an input signal to said second input means of said differential amplifier being inhibited when the reference signal causes current flow through said third and fourth diode means.

3. Signal demodulating means comprising, in combination:
means for supplying an alternating input signal of a given frequency;
differential amplifier means including output means and first and second input means;
circuit means connecting said input signal supplying means to said first and second input means of said differential amplifier means;
first and second switching means each having open and shorted conditions and each having input means, said first and second switching means being connected to said first and second input means respectively of said differential amplifier means; and
reference signal supplying means connected to said input means of said first and second switching means, the connection being such that a reference signal of the same frequency as the frequency of the input signal will open said first and second switching means in alternate half cycle time periods, the open condition of said switching means allowing application of the input signal to one of said input means of said differential amplifier means, a reversible unidirectional signal thereby appearing at said output means of said differential amplifier means, the sense and magnitude of the unidirectional signal being indicative of the phase and amplitude of the alternating input signal.

4. Signal converting means comprising, in combination:
means for supplying an input signal of a given frequency to be demodulated;
differential amplifier means including output means and first and second input means;
circuit means connecting said input signal supplying means to said first and second input means of said differential amplifier means;
first and second gating means each having open and shorted conditions and input means, said first and second gating means being connected to said first and second input means respectively of said differential amplifier means; and
reference signal supplying means connected to said input means of said first and second gating means, the connection being such that a reference signal will open said first and second switching means in alternate time periods, the open condition of said gating means allowing application of the input signal to one of said input means of said differential amplifier means.

5. In demodulating apparatus utilizing not more than one reference transformer comprising, in combination:
differential amplifier means including first input means, second input means and output means, said amplifier means providing a given output signal from said output means upon application of a first input signal of a given amplitude and a first polarity to said first input means, and said amplifier means providing substantially the same given output signal from said output means upon application of a second input signal of the given amplitude and of a second polarity opposite said first polarity to said second input means;

means for supplying an alternating input signal to be demodulated, the signal having sequential half cycles of opposite polarity; and gating means connected between said means for supplying an alternating input signal and said input means of said amplifier means for applying a first half cycle of said alternating input signal only to said first input means of said amplifier means and for applying a second half cycle of said alternating input signal only to said second input means of said amplifier means.

6. In demodulating apparatus utilizing not more than one reference transformer comprising, in combination:

conversion means including first input means, second input means and output means, said conversion means providing a given output signal from said output means upon application of a first input signal of a first polarity to said first input means, said conversion means further providing substantially the same given output signal from said output means upon application of a second input signal of a second polarity to said second input means;

means for supplying an alternating input signal to be demodulated, the signal having sequential half cycles of opposite polarity; and chopping means connected to said means for supplying an alternating input signal for receiving an input therefrom and connected to said input means of said conversion means for applying a first half cycle of said alternating input signal only to said first input means of said conversion means and for applying a second half cycle of said alternating input signal only to said second input means of said conversion means.

7. Demodulating apparatus comprising, in combination:

conversion means including first input means, second input means and output means, said conversion means providing a given output signal from said output means upon application of a first input signal of a given amplitude and a first polarity to said first input means, said conversion means further providing substantially the same given output signal from said output means upon application of a second input signal of the given amplitude and of a second polarity opposite said first polarity to said second input means; and gating means connected to said input means of said conversion means for applying a first half cycle of an alternating input signal to be demodulated only to said first input means of said conversion means and for applying a second half cycle of the same alternating input signal only to said second input means of said signal conversion means.

8. Function generating apparatus comprising, in combination:

ground potential means;

differential amplifier means including first input means, second input means and output means;

signal means for supplying an input signal;

first and second impedance means connecting said signal means to said first and second input means respectively;

first and second diode gating means connected to said first and second impedance means respectively and each being further connected to said ground potential means;

reference means connected to said first and second diode gating means for supplying a gating signal of alternating polarity and a predetermined magnitude thereto, said first diode gating means being connected for placing said impedance means at ground potential upon receipt of said gating signal of a first polarity; and voltage dividing means connected to said first diode switching means and to said reference means for reducing the voltage applied to said first diode gating means below said predetermined magnitude.

9. Function generating apparatus comprising, in combination:

ground potential means;

differential amplifier means including first input means, second input means and output means;

signal means for supplying an input signal;

first and second impedance means connecting said signal means to said first and second input means respectively;

switching means connected to said first and second impedance means respectively and each being further connected to said ground potential means;

reference means connected to said switching means for supplying a switching signal of alternating polarity and a predetermined magnitude thereto, said switching means being connected for placing one of said impedance means at ground potential upon receipt of said switching signal of a first polarity; and voltage dividing means connected to said switching means for reducing the voltage applied to said switching means below said predetermined magnitude.

10. Signal converting apparatus comprising, in combination:

ground potential means;

differential amplifier means including first input means, second input means and output means;

signal means for supplying an input signal;

first and second impedance means connecting said signal means to said first and second input means respectively;

first and second diode gating means connected to said first and second impedance means respectively and each being further connected to said ground potential means; and reference means connected to said first and second diode gating means for supplying a gating signal of alternating polarity thereto, said first diode gating means being connected for placing one of said impedance means at ground potential upon receipt of said gating signal of a first polarity.

11. Signal converting apparatus comprising, in combination:

ground potential means;

differential amplifier means including first input means, second input means and output means;

signal means for supplying an input signal;

first and second impedance means connecting said signal means to said first and second input means respectively;

switching means connected to said first and second impedance means respectively and being further connected to said ground potential means;

reference means connected to said switching means for supplying a switching signal of alternating polarity thereto, said switching means being connected for placing one of said impedance means at ground potential upon receipt of said switching signal of a first polarity.

(References on following page)

References Cited by the Examiner

UNITED STATES PATENTS

| | | | |
|---|---|---|---|
| 2,597,886 | 5/1952 | McCoy | 329—104 X |
| 2,989,652 | 6/1961 | Hall | 307—88.5 |
| 3,065,432 | 11/1962 | Duncan | 332—19 X |
| 3,121,843 | 2/1964 | Ule | 328—133 |
| 3,155,840 | 11/1964 | Hoeschele. | |

OTHER REFERENCES

A Phase-Sensitive Detector Circuit Having High Balance Stability: N. A. Schuster, The Review of Scientific Instruments, vol. 22, No. 4, April 1951, pages 254, 255.

HERMAN KARL SAALBACH, *Primary Examiner.*

ALFRED L. BRODY, P. L. GENSLER, *Assistant Examiners.*